(12) United States Patent
Cheng (10) Patent No.: US 9,986,071 B2
(45) Date of Patent: May 29, 2018

(54) VIRTUAL COMMUNICATION PROTOCOL BUILT IN PHYSICAL COMMUNICATION PROTOCOL

(71) Applicant: TRUSTED SOLUTIONS CORPORATION, New Taipei (TW)

(72) Inventor: Kuang Hung Cheng, New Taipei (TW)

(73) Assignee: TRUSTED SOLUTIONS CORPORATION, New Taipei (TW)

( * ) Notice: Subject to any disclaimer, the term of this patent is extended or adjusted under 35 U.S.C. 154(b) by 278 days.

(21) Appl. No.: 14/966,303

(22) Filed: Dec. 11, 2015

(65) Prior Publication Data

US 2017/0034116 A1    Feb. 2, 2017

(30) Foreign Application Priority Data

Jul. 31, 2015   (TW) .............................. 104124855 A (51) Int. Cl.
| | | |
|---|---|---|
| G06F 15/16 | (2006.01) | |
| H04L 29/08 | (2006.01) | |
| H04L 29/06 | (2006.01) | |
| H04L 29/12 | (2006.01) | |

(52) U.S. Cl.
CPC ........ H04L 69/329 (2013.01); H04L 61/2038 (2013.01); H04L 67/12 (2013.01); H04L 69/08 (2013.01); *H04L 61/2015* (2013.01)

(58) Field of Classification Search
None
See application file for complete search history.

(56) References Cited

U.S. PATENT DOCUMENTS

| | | | | |
|---|---|---|---|---|
| 2014/0241354 | A1* | 8/2014 | Shuman | H04L 67/16 370/390 |
| 2015/0156266 | A1* | 6/2015 | Gupta | H04L 67/12 709/224 |
| 2016/0036764 | A1* | 2/2016 | Dong | H04L 61/3025 370/254 |
| 2016/0249400 | A1* | 8/2016 | Somasandharam | H04W 76/028 |
| 2017/0223479 | A1* | 8/2017 | Ly | H04S 7/302 |

* cited by examiner

*Primary Examiner* — Brian Whipple
*Assistant Examiner* — Gregory P Tolchinsky
(74) *Attorney, Agent, or Firm* — Innovation Capital Law Group, LLP; Vic Lin (57) ABSTRACT

A virtual communication protocol built in a physical communication protocol for solving the problem of conventional IoT devices of different physical communication protocols that fail to communicate with each other by building a virtual communication protocol in present existing physical communication protocols and at a position equivalent to the seventh layer (application layer) of the OSI model. With this virtual communication protocol, any one of the IoT devices is capable of transmitting an IoT command to an IoT console, and then the IoT console transfers the IoT command to a target IoT device, so that the two IoT devices of different physical communication protocols can communicate with each other and achieve the effect of transmitting control commands with each other.

17 Claims, 5 Drawing Sheets

VIRTUAL COMMUNICATION PROTOCOL BUILT IN PHYSICAL COMMUNICATION PROTOCOL

TECHNICAL FIELD

The technical field relates to a virtual communication protocol built in a physical communication protocol, and more particularly to a method of building a virtual communication protocol at the position of the seventh layer (which is an application layer) of the OSI model in an existing physical communication protocol to achieve the communications between two IoT devices of different physical communication protocols.

BACKGROUND

In recent years, Internet of Things (IoT) and IoT devices are developed rapidly and applied in different areas such as the applications of transmitting optimal amount of electricity from public utilities units to homes and shops in the area of smart grids, centralizing the control of smart any device at home or in office in the area of smart building automation, or tracking the location of high-value equipments, patients and motor vehicles accurately by corporations, hospitals or factories in the area of asset tracking. However, each IoT device has its own communication protocol and fails to communicate with other IoT devices of different communication protocols or transmit control commands among one another. As a result, the application of IoT is restricted significantly.

In view of the aforementioned drawback of the conventional IoT with IoT devices of different communication protocols failing to communicate with one another, the inventor of this disclosure conducted extensive researches and experiments, and finally designed a communication method between two IoT devices of different communication protocols to serve the general public and promote the development of the related industry.

SUMMARY

Therefore, it is a primary objective of this disclosure to provide a virtual communication protocol built in a physical communication protocol and executed in an IoT system to achieve the effects of communicating between two IoT devices of different physical communication protocols and transmitting and controlling commands with one another, so as to accomplish the communications between the IoT devices quickly with a low cost.

To achieve the aforementioned objective, this disclosure provides a virtual communication protocol built in a physical communication protocol and executed in an Internet of Things (IoT) system, and the virtual communication protocol having a structure equivalent to a 7-layer structure of an Open Systems Interconnection (OSI) model, and the IoT system comprising at least one IoT console and a plurality of IoT devices connectable to the IoT console, each having a respective physical communication protocol, and the virtual communication protocol of each IoT device being built in each respective physical communication protocol and at a position equivalent to the seventh layer (or application layer) of the OSI model; the IoT console supporting the plurality of physical communication protocols and comprising the respective physical communication protocols of the IoT devices, and the virtual communication protocol being built in a plurality of physical communication protocols of the IoT console and at a respective position equivalent to the seventh layer (or the application layer); and the virtual communication protocol of each IoT device including a unique dynamic IoT address of the IoT device allocated by the IoT console, so that each IoT device has a dynamic IoT address different from other IoT devices.

Wherein, the IoT device is connected to the IoT console through the physical communication protocol of the IoT device and transmits data for requesting the IoT address to the IoT console, and the IoT console allocates a unique dynamic IoT address to the IoT device.

Wherein, after the IoT console allocates a unique dynamic IoT address to each of the IoT devices, the data transmitted from any one of the IoT devices connected to the IoT console are first information packets, and the first information packet includes a physical communication protocol of the respective IoT device and a virtual communication protocol built in the physical communication protocol and at a position equivalent to the seventh layer (or the application layer) of the OSI model, and the virtual communication protocol includes an IoT source address, an IoT target address and at least one IoT command or request; and the IoT source address is the dynamic IoT address of the IoT device and the IoT device has a communication destination; and a target IoT device is another IoT device of the internet of things, and the IoT target address is a dynamic IoT address of the target IoT device, and the IoT command or request is a command or request requested by the IoT device and executed by target IoT device.

Wherein, after any one of the IoT devices transmits the first information packet to the IoT console, the IoT console receives the first information packet and analyzes the first information packet to issue a second information packet to be transmitted to the target IoT device and the second information packet includes a physical communication protocol of the target IoT device and a virtual communication protocol built in the physical communication protocol and at a position equivalent to the seventh layer (or the application layer of the OSI model, and the physical communication protocol of the target IoT device includes a source address and a target address in compliance with the respective protocol, so that the second information packet can be transmitted to the target IoT device correctly, and the virtual communication protocol of the second information packet includes the same information of the virtual communication protocol in the first information packet, the IoT source address, the IoT target bit address and the IoT command or request.

Wherein, after the IoT console transmits the second information packet to the target IoT device, the target IoT device receives the second information packet, analyzes the second information packet, examines the content of the virtual communication protocol, confirms the IoT source address, and executes the IoT command or request.

Wherein, the physical communication protocol includes a Transmission Communication Protocol/Internet Protocol (TCP/IP), a Bluetooth communication protocol, a Zigbee communication protocol, a RS-232 communication protocol, a Wireless Fidelity (Wi-Fi) communication protocol, a Long Term Evolution (LTE) communication protocol, a Radio Frequency Identification (RFID) communication protocol, or a Near Field Communication (NFC) communication protocol.

Wherein, the IoT console is a gateway, a router, a switch or a sharer.

Wherein, the IoT console is a mobile device.

Wherein, the mobile device is a mobile phone, a notebook, a tablet PC or a personal digital assistant (PDA).

Wherein, the IoT console includes a plurality of physical communication protocols stored in a memory of the IoT console.

In addition, the protocol of this disclosure may be operated successfully in a plurality of internets of things, and the method technology includes a virtual communication protocol built in a physical communication protocol and executed in a plurality of internets of things, and the plurality of internets of things includes at least one first internet of things and a second internet of things, and the first internet of things includes a first IoT console and a plurality of first IoT devices connectable to the first IoT console, and the second internet of things includes a second IoT console and a plurality of second IoT devices connectable to the second IoT console.

Each of the first IoT devices has its own first physical communication protocol, and any one of the first IoT devices has a first virtual communication protocol built in the first physical communication protocol and at a position equivalent to the seventh layer of the OSI model, and the first virtual communication protocol has an equivalent seven-layer structure of the OSI model.

Each of the second IoT devices has its own second physical communication protocol, and any one of the second IoT devices has a second virtual communication protocol built in the second physical communication protocol and at a position equivalent to the seventh layer of the OSI model, and the second virtual communication protocol has an equivalent seven-layer structure of the OSI model.

The first IoT console supports a plurality of physical communication protocols and comprises the first physical communication protocol of each respective first IoT devices, and the plurality of first physical communication protocols of the first IoT console has the first virtual communication protocol built in the first physical communication protocol and at a position equivalent to the seventh layer of the OSI model.

The second IoT console supports a plurality of physical communication protocols and comprises a second physical communication protocol of each of the respective second IoT devices, and the plurality of second physical communication protocols of the second IoT console has the second virtual communication protocol built in the second physical communication protocol and at a position equivalent to the seventh layer of the OSI model.

Any one of the first IoT devices is connected to the first IoT console through its own first physical communication protocol and sends a piece of data to the first IoT console to request an IoT address, and then the first IoT console allocates a unique first console dynamic IoT address to the first IoT device, so that the first IoT device has a first console dynamic IoT address different from those of other first IoT devices.

Any one of the second IoT devices is connected to the second IoT console through its own second physical communication protocol and sends a piece of data to the second IoT console to request an IoT address, and then the second IoT console allocates a unique second console dynamic IoT address to the second IoT device, so that the second IoT device has a second console dynamic IoT address different from those of other second IoT devices.

In this disclosure, after the first IoT console allocates a unique first console dynamic IoT address to the first IoT device, the data transmitted by the first IoT device to the connected first IoT console are a third information packet, and the third information packet includes a first physical communication protocol of the first IoT device and a first virtual communication protocol built in the first physical communication protocol and at a position equivalent to the seventh layer of the OSI model, and the first virtual communication protocol includes a first console IoT source packet, a first console IoT target address and a first console IoT command or request; wherein the first console IoT source packet is the first console dynamic IoT address of the first IoT device, and the first IoT device has a communication destination, and a first target IoT device is another first target IoT device of the first internet of things, the first console IoT target address is the first console dynamic IoT address of the first target IoT device, and the first console IoT command or request is a command or request requested by the first IoT device and executed by the first target IoT device.

After the second IoT console allocates a unique second console dynamic IoT address to the second IoT device, the data transmitted by the second IoT device to the connected second IoT console are a fourth information packet, and the fourth information packet includes a second physical communication protocol of the second IoT device and a second virtual communication protocol built in the second physical communication protocol and at a position equivalent to the seventh layer of the OSI model, and the second virtual communication protocol includes a second console IoT source packet, a second console IoT target address and a second console IoT command or request, wherein the second console IoT source packet is a second console dynamic IoT address of the second IoT device, and the second IoT device has a communication destination; and a second target IoT device is another second IoT device of the second internet of things, and the second console IoT target address is the second console dynamic IoT address of the second target IoT device, and the second console IoT command or request is a command or request requested by the second IoT device and executed by the second target IoT device.

In this disclosure, after any one of the first IoT devices transmits the third information packet to the first IoT console, the first IoT console receives the third information packet, and the first IoT console analyzes the third information packet and sends a fifth information packet to the first target IoT device, and the fifth information packet includes a first physical communication protocol of the first target IoT device and a first virtual communication protocol built at a position of the first physical communication protocol equivalent to the seventh layer of the OSI model, and the first target IoT device of the first physical communication protocol includes a source packet and a target address in compliance with the specification of the first target IoT device, so that the fifth information packet can be transmitted correctly to the first target IoT device, and the first virtual communication protocol of the fifth information packet includes the same information in the first virtual communication protocol of the third information packet such as the first console IoT source packet, the first console IoT target address and the first console IoT command or request.

After any one of the second IoT devices transmits the fourth information packet to the second IoT console, the second IoT console receives the fourth information packet, and the second IoT console analyzes the fourth information packet and transmits a sixth information packet to the second target IoT device, and the sixth information packet includes a second physical communication protocol of the second target IoT device and a second virtual communication protocol built in the second physical communication protocol and at a position equivalent to the seventh layer of the OSI model, the second physical communication protocol of the second target IoT device includes a source packet and a target address in compliance with its specification, so that the sixth information packet can be transmitted to the second target IoT device correctly, and the second virtual communication protocol of the sixth information packet includes the same information of the second virtual communication protocol of the fourth information packet such as the second console IoT source packet, the second console IoT target address and the second console IoT command or request.

In this disclosure, after the first IoT console transmits the fifth information packet to the first target IoT device, the first target IoT device receives the fifth information packet, and the first target IoT device analyzes the fifth information packet, examines the content of the first virtual communication protocol, confirms the first console IoT source packet, and executes the first console IoT command or request;

After the second IoT console transmits the sixth information packet to the second target IoT device, the second target IoT device receives the sixth information packet, and the second target IoT device analyzes the sixth information packet, examines the content of the second virtual communication protocol, confirms the second console IoT source packet, and executes the second console IoT command or request.

In this disclosure, the plurality of internets of things includes at least one multi-net IoT device, and the multi-net IoT device has the first physical communication protocol of the first IoT device and the second physical communication protocol of the second IoT device simultaneously, so that the multi-net IoT device can be connected with the first IoT console and the second IoT console. The multi-net IoT device communicates and transmits commands to other first IoT devices of the first internet of things by the first IoT console through the first virtual communication protocol of the first physical communication protocol, and the multi-net IoT device communicates and transmits commands to other second IoT devices of the second internet of things by the second IoT console through the second virtual communication protocol built in the second physical communication protocol.

In this disclosure, the first physical communication protocol or the second physical communication protocol is a TCP/IP communication protocol, a Bluetooth communication protocol, a Zigbee communication protocol, a RS-232 communication protocol, a Wireless Fidelity (Wi-Fi) communication protocol, a Long Term Evolution (LTE) communication protocol, a Radio Frequency Identification (RFID) communication protocol, or a Near Field Communication (NFC) communication protocol.

In this disclosure, the first IoT console or the second IoT console is a gateway, a router, a switch or a sharer.

In this disclosure, the first IoT console or the second IoT console is a mobile device.

In this disclosure, the mobile device is a mobile phone, a notebook, a tablet PC or a personal digital assistant (PDA).

In this disclosure, the plurality of first physical communication protocols included in the first IoT console is stored in a memory of the first IoT console, and the plurality of second physical communication protocols included in the second IoT console is stored in a memory of the second IoT console.

More specifically, the technical characteristics and effects of this disclosure will become apparent with the detailed description of preferred embodiments and the illustration of related drawings as follows.

DESCRIPTION OF THE PREFERRED EMBODIMENTS

The technical content of this disclosure will become apparent with the detailed description of preferred embodiments and the illustration of related drawings as follows.

Figure 1:
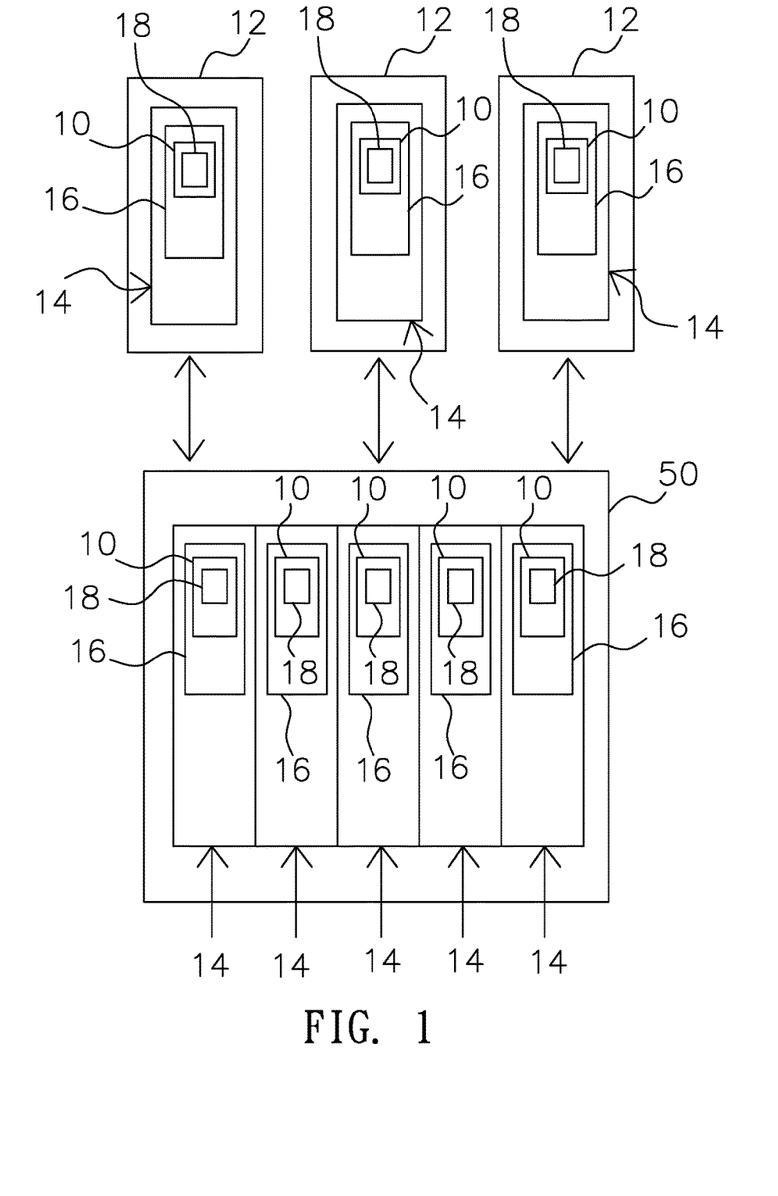
FIG. 1 is a schematic view of the structure of a first preferred embodiment of this disclosure.

With reference to FIG. 1 for a virtual communication protocol built in a physical communication protocol in accordance with a first preferred embodiment of this disclosure, the virtual communication protocol built in a physical communication protocol 10 is executed in an Internet of Things (IoT) system, and the virtual communication protocol 10 has a structure equivalent to a seven-layer structure of an OSI model 7.

The IoT system includes at least one IoT console 50 and a plurality of IoT devices 12.

Each of the plurality of IoT devices 12 has a respective physical communication protocol 14, and each of the virtual communication protocol 10 is built in the physical communication protocol 14 of each respective IoT device 12 and at a position 16 equivalent to the seventh layer (or application layer) of the OSI model.

The IoT console 50 supports the plurality of physical communication protocols 14 and comprises a physical communication protocol 14 of each respective IoT device 12, and the virtual communication protocol 10 of the IoT console 50 is built in each of the plurality of physical communication protocols 14 and at a position 16 equivalent to the seventh layer (or application layer) of the OSI model.

The virtual communication protocol 10 of each IoT device 12 includes a unique dynamic IoT address 18 allocated to the respective IoT device 12 by the IoT console 50, so that each IoT device 12 has a dynamic IoT address 18 different from other IoT devices 12.

Wherein, the IoT device 12 refers to any object (such as a sensor, an electric appliance, etc) having an addressable communication interface (such as Near Field Communication (NFC) ID, Internet Protocol (IP) address, Bluetooth Identification (ID), etc) for transmitting information to one or more devices via a cable or wireless connection, and the IoT device 12 has a passive communication interface (such as a NFC tag, a quick response (QR) code, or a radio frequency identification (RFID) tag), or an active communication interface (such as a transceiver, a modem, etc), and the IoT device 12 includes (but not limited to) a refrigerator, an oven, a stove, a microwave oven, a cooler, a dish washer, a tableware, a hand tool, a washing machine, a dryer, a furnace, a heater/air-conditioner, a television, a lamp, a vacuum cleaner, a sprinkler, etc having an addressable communication interface for the IoT communication. Of course, the IoT device 12 may include a desktop, a notebook, a tablet PC, a mobile phone, a personal digital assistant (PDA), etc.

Wherein, the IoT console 50 refers to a device capable of communicating with each IoT device 12, so that the IoT console 50 comprises a physical communication protocol 14 of each of the respective IoT devices 12 and the IoT console 50 is capable of communicating with each IoT device 12 by the physical communication protocol 14 of each of the respective IoT devices 12. For example, if the physical communication protocol 14 of an IoT device 12 is the TCP/IP communication protocol, and the physical communication protocol 14 of another IoT device 12 is the Zigbee communication protocol, and the physical communication protocol 14 of a further IoT device 12 is a Wireless Fidelity (Wi-Fi) communication protocol, then the IoT console 50 should have the physical communication protocols 14 of the TCP/IP communication protocol, Zigbee communication protocol and Wi-Fi communication protocol to facilitate the IoT console 50 to communication with each IoT device 12 through the physical communication protocol 14 of each respective IoT device 12.

The IoT console 50 may be a gateway, a router, a switch or a sharer, so that the IoT console 50 concurrently has the function of other devices.

Wherein, the IoT console 50 may be a mobile device such as a mobile phone, a notebook, a tablet PC or a personal digital assistant (PDA), so that the IoT console 50 concurrently has the function of the mobile device.

Wherein, the physical communication protocols 14 included in the IoT console 50 are stored in a memory of the IoT console 50, and the memory includes but not limited to a flash memory, a firmware, an electrically erasable programmable read only memory (EEPROM), a random access memory (RAM), a hard disk, a floppy disk, and an optical disk.

Wherein, the OSI model is an Open System Interconnection Reference Model which is a conceptual model proposed by the International Standard Organization (ISO) and used as a standard frame of connecting computers around the world via networks. The 7-layer structure of the OSI model includes a first layer (Physical Layer), a second layer (Data Link Layer), a third layer (Network Layer), a fourth layer (Transport Layer), a fifth layer (Session Layer), a sixth layer (Presentation Layer), and a seventh layer (Application Layer).

Wherein, the virtual communication protocol 10 is built in the physical communication protocol 14 of each respective IoT device 12 and at a position 16 equivalent to the seventh layer (or application layer) of the OSI model. For example, the physical communication protocol 14 of a certain IoT device 12 is the TCP/IP communication protocol, and the TCP/IP communication protocol generally includes a four-layer model comprising a first layer (Network Interface Layer which is equivalent to the first and second layers of the OSI model), a second layer (Network Interconnection Layer which is equivalent to the third layer of the OSI model), a third layer (Transport Layer which is equivalent to the fourth layer of the OSI model), and a fourth layer (Application Layer which is equivalent to the fifth to seventh of the OSI model), and the position 16 of the TCP/IP communication protocol equivalent to the seventh layer (or application layer) of the OSI model is the fourth layer (or application layer) of the TCP/IP communication protocol, so that the virtual communication protocol 10 is built in the fourth layer (or application layer) of the TCP/IP communication protocol.

Wherein, the virtual communication protocol 10 is built in each of the plurality of physical communication protocols 14 of the IoT console 50 and at a position 16 equivalent to the seventh layer (or application layer) of the OSI model. For example, the IoT console 50 includes but not limited to the physical communication protocols 14 such as the TCP/IP communication protocol, Bluetooth communication protocol, Zigbee communication protocol, RS-232 communication protocol, Wireless Fidelity (Wi-Fi) communication protocol, Long Term Evolution (LTE) communication protocol, Radio Frequency Identification (RFID) communication protocol, or Near Field Communication (NFC) communication protocol, etc. The position 16 of the TCP/IP communication protocol equivalent to the seventh layer of the OSI model is the fourth layer (or application layer) of the TCP/IP communication protocol; the position 16 of the Zigbee communication protocol equivalent to the seventh layer of the OSI model is the fourth layer (or application layer) of the Zigbee communication protocol, and other physical communication protocols 14 also have the position 16 equivalent to the seventh layer of the OSI model, and these are prior art and thus will not be described in details. Each physical communication protocol 14 included in the IoT console 50 has the virtual communication protocol 10.

Therefore, each IoT device 12 not just communicates with the IoT console 50 through its respective physical communication protocol 14 only, but also has a virtual communication protocol 10 and its respective dynamic IoT address 18, so that the dynamic IoT address 18 represents the address of the IoT device 12. By using the IoT console 50 as a medium and the virtual communication protocol 10 as a bridge, the IoT devices 12 of different physical communication protocols 14 can communicate with one another.

Figure 2:
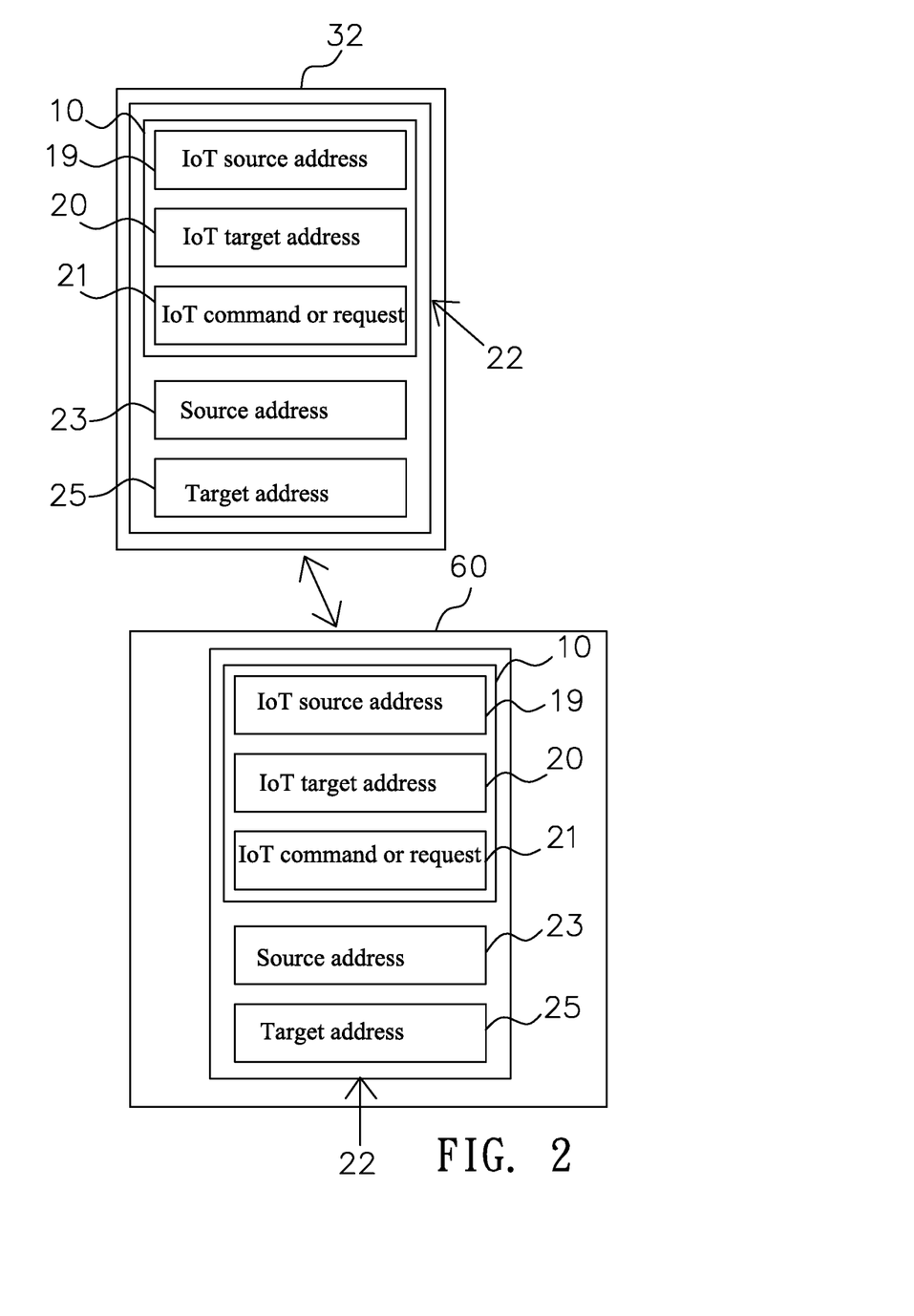
FIG. 2 is a schematic view of the structure of a second preferred embodiment of this disclosure.

With reference to FIG. 2 for a virtual communication protocol built in a physical communication protocol in accordance with a second preferred embodiment of this disclosure, the method for the IoT device of this disclosure to use the virtual communication protocol 10 to obtain a dynamic IoT address 18 is described.

The IoT console 60 of the TCP/IP communication protocol 22 has an IoT device 32 of the TCP/IP communication protocol 22. Before the virtual communication protocol of the IoT device 32 is created, it is necessary to build the original TCP/IP communication protocol. The common Dynamic Host Configuration Protocol (DHCP) is used for example, and the IoT device 32 requests a dynamic network IP address from the DHCP server (a host of the network or the IoT console 60). As to the IoT device 32, such dynamic network IP address is the source address 23 in the TCP/IP communication protocol 22. After obtaining the dynamic network IP address, the IoT device may perform communication and data exchange with the IoT console 60.

After obtaining the dynamic network IP address, the IoT device 32 just can perform general TCP/IP communication protocol related application with the IoT console 60 only. If the IoT device 32 needs to connect with the IoT function of the IoT console 60 by the virtual communication protocol 10 IoT, the IoT device 32 must use the present existing TCP/IP communication protocol for the connection and send data for requesting the dynamic IoT address 18 (or code) to the IoT console 60. Now, the IoT console 60 will allocate an applicable dynamic IoT address 18 of the IoT device 32 to the IoT device 32. Then, the IoT device 32 can use the dynamic IoT address 18 to send/receive IoT related commands or requests to/from the IoT console 60. As to the IoT device 32, the dynamic IoT address 18 is an IoT source address 19 in the virtual communication protocol (which is the IoT communication protocol).

For example, the IoT device 32 has no IP at the beginning, so that the IoT device 32 broadcasts to the whole network and asks who can assign an IP to the IoT device 32. Since the IoT console 60 has the function of allocating a DHCP dynamic IP, therefore a set of IP is transmitted to the IoT device 32 for the use by the IoT device 32, and the IoT device 32 obtains a dynamic IoT address 18 with an IP being 192.168.1.2. As to the IoT device 32, such dynamic network IP address is a source address 23 in the TCP/IP communication protocol 22), and the IP of the IoT console 60 is 192.168.1.1. As to the IoT device 32, such IP address is the target address 25 in the TCP/IP communication protocol 22). The IoT device 32 uses 192.168.1.2 as the source address 23 and transmits the data asking its own IoT address to IoT console 60 with a target address 25 of 192.168.1.1. The IoT console 60 receives the request and uses the source address of 192.168.1.1 to transmits the request to the IoT device 32 of 192.168.1.2 and having an IoT address being named as enddevice01, which is the IoT address representing the IoT device 32 in the virtual communication protocol.

In this embodiment, if the IoT device 32 needs to transmit an IoT command to the IoT console 60, the IoT command will be loaded to the network packet of 192.168.x and includes the contents of the virtual communication protocol 10 (or IoT communication protocol) such as an IoT command transmitted from the address being enddevice01 (which is the IoT source address 19), an IoT command received by a bit address being manager01 (which is the IoT target address 20) and an IoT command or request 21 executed by a device at the receiving address.

Therefore, a packet transmitted from the IoT device 32 to the IoT console 60 through the virtual communication protocol is called a first information packet, and the first information packet comprises the following structures:

Virtual communication protocol 10 (or IoT communication protocol):
1. IoT source address 19: enddevice01
2. IoT target address 20: manager01
3. IoT command or request 21: read temp Physical communication protocol (TCP/IP communication protocol 22):
1. Source address 23: 192.168.1.2
2. Target address 25: 192.168.1.1

In other words, an IoT device 32 is connected to an IoT console 60 through its respective physical communication protocol and transmits data to the IoT console 60 for requesting an IoT address, and then the IoT console 60 allocates a unique dynamic IoT address 18 to the IoT device 32.

After the IoT console 60 allocates a unique dynamic IoT address 18 to the IoT device 32, the data transmitted from the IoT device 32 to the connected IoT console 60 are a first information packet, and the first information packet includes a physical communication protocol of the IoT device 32 and a virtual communication protocol 10 built in the physical communication protocol and at a position equivalent to the seventh layer (or application layer) of the OSI model, and the virtual communication protocol 10 includes an IoT source address 19, an IoT target address 20 and at least one IoT command or request 21, wherein the IoT source address 19 is a dynamic IoT address 18 of the IoT device 32, and the IoT target address 20 is a dynamic IoT bit address of the target IoT device 32, and the IoT command or request 21 is a command or request requested by the IoT device 32 and executed by the target device.

The dynamic IoT address 18 refers to a new address or code dynamically reallocated to a IoT device 12 by the IoT console 50, and the new address or code is the dynamic IoT address 18. After a IoT device 12 starts or enters into the internet of things of the IoT console 50, the IoT console 50 allocates a dynamic IoT address 18 to the IoT device 12 through the request made by the IoT device 12 to the IoT console 50, and this method is practical and useful for an internet of things that frequently changes each IoT device 12, so that the IoT console 50 can control each of the IoT devices 12 of the internet of things completely.

Figure 3:
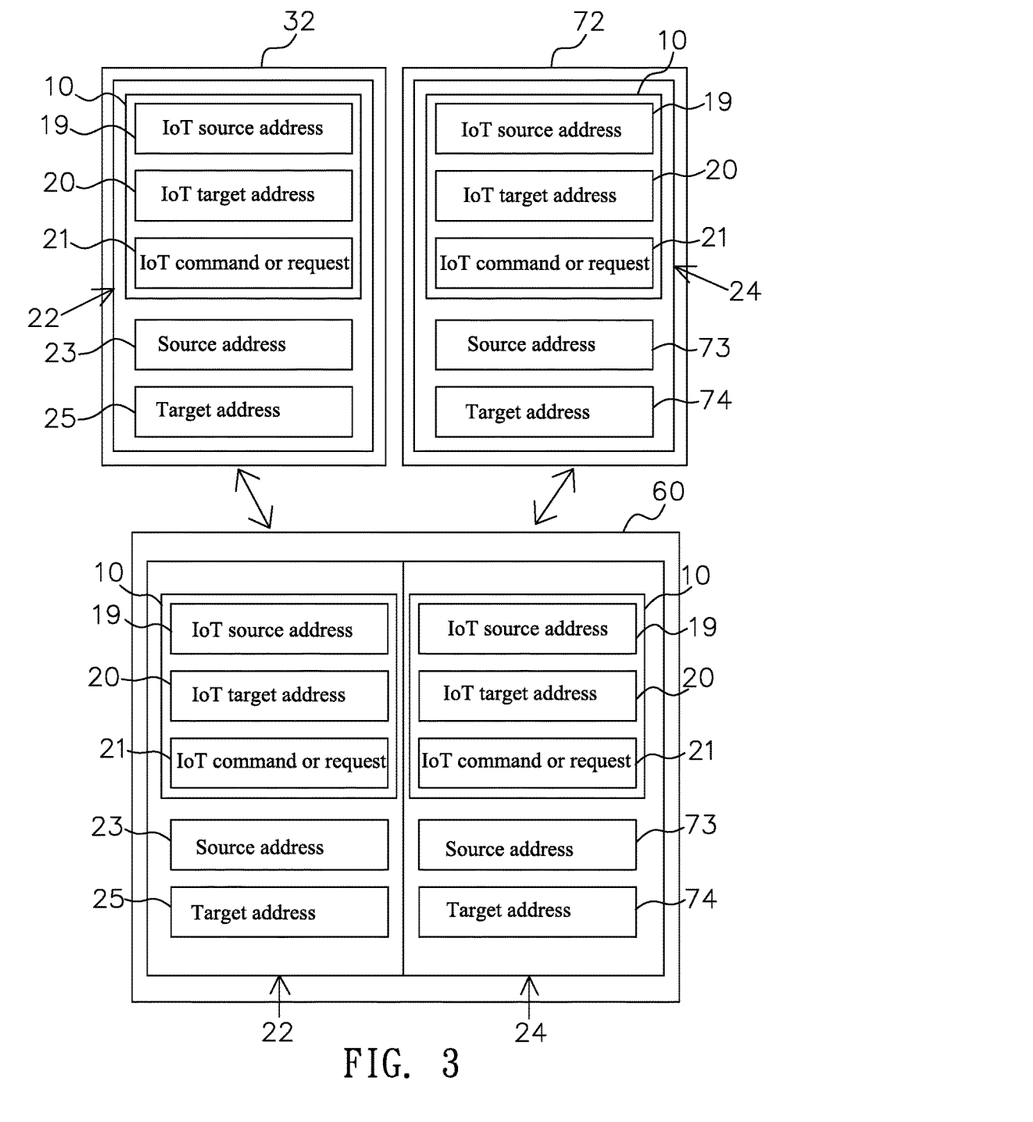
FIG. 3 is a schematic view of the structure of a third preferred embodiment of this disclosure.

With reference to FIG. 3 for a virtual communication protocol built in a physical communication protocol in accordance with a third preferred embodiment of this disclosure, this disclosure applies the virtual communication protocol to cross different physical communication protocols, so that the IoT devices of different physical communication protocols 14 can communicate with one another.

The IoT console 60 has a TCP/IP communication protocol 22 and a Zigbee communication protocol 24; an IoT device 32, having the TCP/IP communication protocol 22; a target IoT device 72 having a Zigbee communication protocol 24, and the IoT device 32 and the IoT console 60 communicate through the TCP/IP communication protocol 22, and the target IoT device 72 and the IoT console 60 use the Zigbee communication protocol 24 to perform communications.

In an embodiment, how the IoT device 32 transmits an IoT command for turning off the device to the target IoT device 72 is described.

Before the virtual communication protocol 10 is built according to the method as illustrated in FIG. 2, the IoT device 32 obtains its IoT address enddevice01 from the IoT console 60 through the TCP/IP communication protocol 22. Similarly, the target IoT device 72 obtains its IoT address enddevice02 from the IoT console 60 through the Zigbee communication protocol 24.

After the virtual communication protocol 10 is built, if the IoT device 32 needs to transmit an IoT command to the target IoT device 72, the IoT device 32 will transmit a packet (which is the first information packet) to the IoT console 60 through the TCP/IP communication protocol 22, the first information packet. Besides the original TCP/IP communication protocol 22 related data (including the source address, the target address, etc), the data in the application layer of the TCP/IP communication protocol 22 further mark that the packet comes from enddevice01, and the recipient of this packet is enddevice02, and the IoT command is to turn off the device.

After the IoT console 60 receives the first information packet transmitted from the IoT device 32, the IoT console 60 examines the data in the virtual communication protocol 10 of the application layer of the TCP/IP communication protocol 22 and discovers that the packet recipient is enddevice02. Therefore, the first information packet minus the data of the source address 23 and the target address 25 of the pure application layer of the TCP/IP communication protocol is transmitted by the Zigbee communication protocol 24 instead. The data (such as the source address 73, the target address 74, etc) are added to the Zigbee communication protocol 24 before the transmission takes place, so as to allow the target IoT device 72 to receive the information. In the processing, the packet transmitted to the target IoT device 72 through the Zigbee communication protocol 24 includes the content of the virtual communication protocol 10, and the packet of this embodiment is a second information packet.

The target IoT device 72 receives the second information packet transmitted from the Zigbee communication protocol 24, examines the virtual communication data of the application layer, discovers that the packet is transmitted from enddevice01, and the recipient is designated to enddevice02, and confirms that the second information packet is transmitted from enddevice01 to the target IoT device 72 (without knowing the TCP/IP address of the opposite party), and also discovers that the command in the virtual communication protocol 10 of the second information packet is to turn off the device. After the packet is analyzed, the target IoT device 72 executes the command in the virtual communication protocol 10 to perform the shutdown.

In this embodiment, a packet transmitted from the IoT device 32 to the IoT console 60 through the virtual communication protocol is called a first information packet, and the first information packet comprises the following structures:

Virtual communication protocol 10 (or IoT communication protocol):
1. IoT source address 19: enddevice01
2. IoT target address 20: enddevice02
3. IoT command or request 21: Turn off the device Physical communication protocol (TCP/IP communication protocol 22):
1. Source address 23: 192.168.1.2
2. Target address 25: 192.168.1.1

Similarly, a packet transmitted from the IoT console 60 to the target IoT device 72 through the virtual communication protocol is called a second information packet, and the second information packet comprises the following structures:

Virtual communication protocol 10 (or IoT communication protocol):
1. IoT source address 19: enddevice01
2. IoT target address 20: enddevice02
3. IoT command or request 21: Turn off the device Physical communication protocol (Zigbee communication protocol 24):
1. Source address 73 PAN ID: 0x32
2. Target address 74 PAN ID: 0x41

In other words, after the IoT device 32 transmits the first information packet to the IoT console 60, the IoT console 60 receives the first information packet, analyses the first information packet, and transfers a second information packet to the target IoT device 72, and the second information packet includes a physical communication protocol 14 of the target IoT device 72 and a virtual communication protocol 10 built in the physical communication protocol 14 and at a position 16 equivalent to the seventh layer (application layer) of the OSI model, and the physical communication protocol 14 of the target IoT device 72 includes a source address 73 and a target address 74 in compliance with the respective protocol, so that the second information packet can be transmitted to the target IoT device 72 accurately, and the virtual communication protocol 10 of the second information packet includes the same information in the virtual communication protocol 10 of the first information packet such as the IoT source address 19, the IoT target address 20 and the IoT command or request 21.

After the IoT console 60 transfers the second information packet of the target IoT device 72, the target IoT device 72 receives the second information packet, analyzes the second information packet, examines the content of the virtual communication protocol 10, confirms the IoT source address 19, and executes the IoT command or request 21. Therefore, two IoT devices of different physical communication protocols can communicate with each other.

Figure 4:
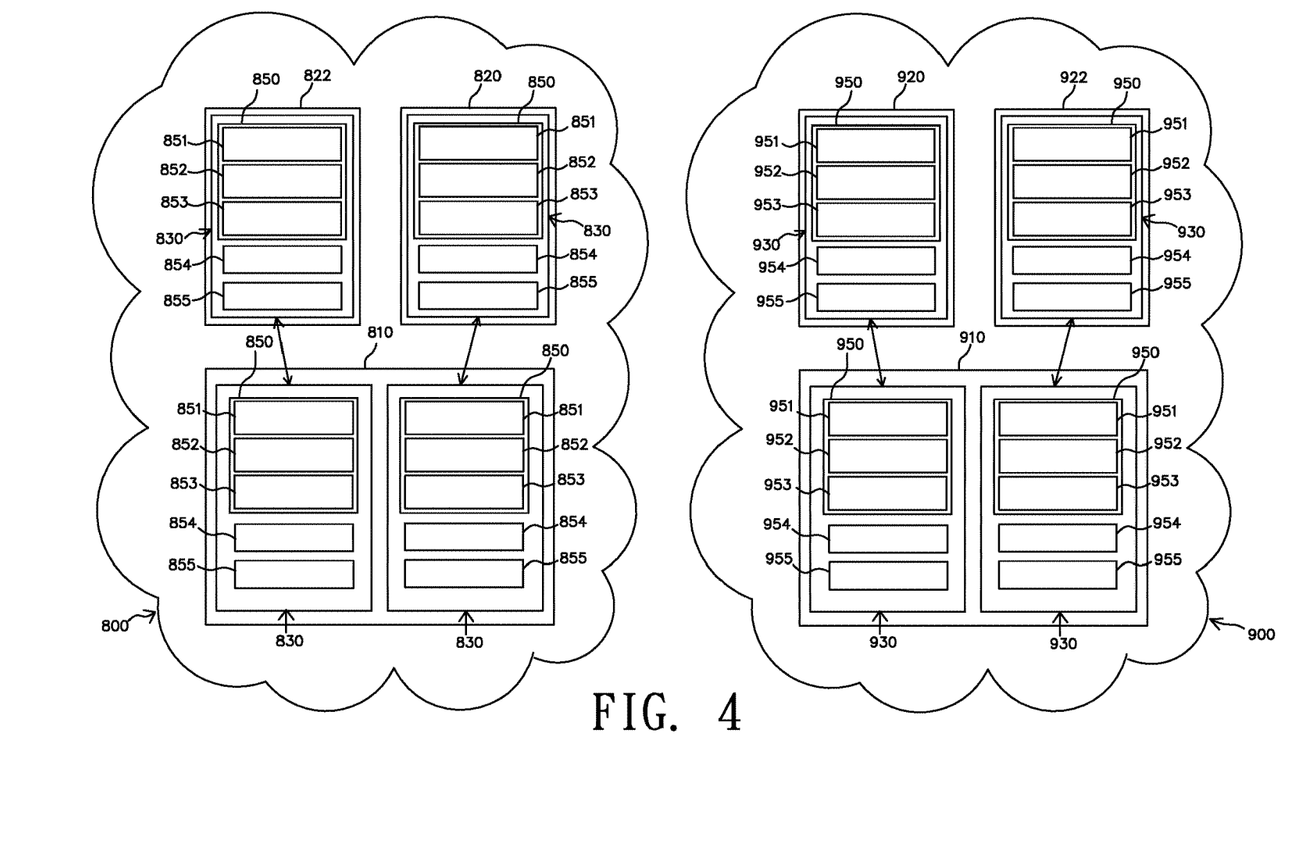
FIG. 4 is a schematic view of the structure of a fourth preferred embodiment of this disclosure.

With reference to FIG. 4 for a virtual communication protocol built in a physical communication protocol in accordance with the fourth preferred embodiment of this disclosure, this embodiment further describes the method of applying this disclosure to a plurality of internets of things and further extends the operation of a single internet of things.

In this preferred embodiment, a virtual communication protocol built in a physical communication protocol in accordance with this disclosure is executed in a plurality of internets of things, and the plurality of internets of things includes at least one first internet of things 800 and a second internet of things 900, and the first internet of things 800 includes a first IoT console 810 and a plurality first IoT devices 820 connectable to the first IoT console 810, and the second internet of things 900 includes a second IoT console 910 and a plurality of second IoT devices 920 connectable to the second IoT console.

Each of the first IoT devices 820 has its own first physical communication protocol 830, and any one of the first IoT devices 820 has a first virtual communication protocol 850 built the first physical communication protocol 830 and at a position equivalent to the seventh layer of the OSI model, and the first virtual communication protocol 850 has an equivalent seven-layer structure of the OSI model.

Each of the second IoT devices 920 has its own second physical communication protocol 930, and any one of the second IoT devices 920 has a second virtual communication protocol 950 built in the second physical communication protocol 930 and at a position equivalent to the seventh layer of the OSI model, and the second virtual communication protocol 950 has an equivalent seven-layer structure of the OSI model.

The first IoT console 810 supports a plurality of physical communication protocols and comprises a first physical communication protocol 830 of the respective first IoT devices 820, and the plurality of first physical communication protocols 830 of the first IoT console 810 has the first virtual communication protocol 850 built in the first physical communication protocol and 830 and at a position equivalent to the seventh layer of the OSI model.

The second IoT console 910 supports a plurality of physical communication protocols and comprises a second physical communication protocol 930 of each of the respective second IoT devices 920, and the plurality of second physical communication protocols 930 of the second IoT console 910 has the second virtual communication protocol 950 built in the respective second physical communication protocol 930 and at a position equivalent to the seventh layer of the OSI model.

Wherein, the first physical communication protocol 830 or the second physical communication protocol 930 is a TCP/IP communication protocol, a Bluetooth communication protocol, a Zigbee communication protocol, a RS-232 communication protocol, a Wireless Fidelity (Wi-Fi) communication protocol, a Long Term Evolution (LTE) communication protocol, a Radio Frequency Identification (RFID) communication protocol, or a Near Field Communication (NFC) communication protocol.

Wherein, the first IoT console 810 or the second IoT console 910 is a gateway, a router, a switch or a sharer, so that the IoT console has the functions of other devices concurrently.

Wherein, the first IoT console 810 or the second IoT console 910 is a mobile device, and the mobile device may be a mobile phone, a notebook, a tablet PC or a personal digital assistant (PDA), so that the IoT consoles have the function of the mobile device.

Wherein, the plurality of first physical communication protocols 830 included in the first IoT console 810 is stored in a memory of the first IoT console 810, and the plurality of second physical communication protocols 930 included in the second IoT console 910 is stored in a memory of the second IoT console 910, and the type of memory is not limited, and it may be a flash memory, a firmware, an Electrically-Erasable Programmable Read-Only Memory (EEPROM), a Random Access Memory (RAM), a hard disk, a floppy disk, an optical disk, etc.

The method of obtaining the dynamic IoT addresses of the first IoT device 820 and the second IoT device 920 in two internets of things by the virtual communication protocol in accordance with this disclosure is described below.

Any one of the first IoT devices 820 is connected to the first IoT console 810 by its respective first physical communication protocol 830 and transmits a piece of data to the first IoT console 810 to request an IoT address, and then the first IoT console 810 allocates a unique first console dynamic IoT address to the first IoT device 820, so that the first IoT device 820 has a first console dynamic IoT address different from those of other first IoT devices 820.

Any one of the second IoT devices 920 is connected to the second IoT console 910 by its second physical communication protocol 930 and transmits a piece of data to the second IoT console 910 to request an IoT address, and then the second IoT console 910 allocates a unique second console dynamic IoT address to the second IoT device 920, so that the second IoT device 920 has a second console dynamic IoT address different from those of other second IoT devices 920.

The method of communicating with the first IoT device 820, the second IoT device 920 and other IoT devices, transmitting a command to such IoT device, and executing the command of such IoT device in two internets of things in accordance with this disclosure is described below.

After the first IoT console 810 allocates a unique first console dynamic IoT address to the first IoT device 820, the data transmitted from the first IoT device 820 to the connected first IoT console 810 are a third information packet, and the third information packet includes the first physical communication protocol 830 of the first IoT device 820 and the first virtual communication protocol 850 built in the first physical communication protocol 830 and at a position equivalent to the seventh layer of the OSI model, and the first virtual communication protocol 850 includes a first console IoT source packet 851, a first console IoT target address 852 and a first console IoT command or request 853.

Wherein, the first console IoT source packet 851 is the first console dynamic IoT address of the first IoT device 820, and the first IoT device 820 has a communication destination, and the first target IoT device 822 and the first target IoT device 822 are other first IoT devices of the first internet of things 800, and the first console IoT target address 852 is the first console dynamic IoT address of the first target IoT device 822, and the first console IoT command or request 853 is a command or request requested by the first IoT device 820 and executed by the first target IoT device 822.

After the second IoT console 910 allocates a unique second console dynamic IoT address to the second IoT device 920, the data transmitted from the second IoT device 920 to the connected second IoT console 910 are a fourth information packet, and the fourth information packet includes a second physical communication protocol 930 of the second IoT device 920 and a second virtual communication protocol 950 built in the second physical communication protocol 930 and at a position equivalent to the seventh layer of the OSI model, and the second virtual communication protocol 950 includes a second console IoT source packet 951, a second console IoT target address 952 and a second console IoT command or request 953, wherein the second console IoT source packet 951 is the second console dynamic IoT address of the second IoT device 920, and the second IoT device 920 has a communication destination, and a second target IoT device 922 which is another second IoT device of the second internet of things 900, and the second console IoT target address 952 is the second console dynamic IoT address of the second target IoT device 922, and the second console IoT command or request 953 is a command or request requested by the second IoT device 920 and executed by the second target IoT device 922.

The method for the first IoT console 810 of the first internet of things 800 to communicate with and transmit commands to the first target IoT device 822 in the first internet of things 800 of the two internets of things by the first IoT console 810 and for the second IoT device 920 of the second internet of things 900 to communicate and transmit commands to the second target IoT device 922 by the second IoT console 910 in accordance with this disclosure is described below.

After any one of the first IoT devices 820 transmits the third information packet to the first IoT console 810, the first IoT console 810 receives the third information packet, and the first IoT console 810 analyzes the third information packet and transmits a fifth information packet to the first target IoT device 822, and the fifth information packet includes a first physical communication protocol 830 of the first target IoT device 822 and a first virtual communication protocol 850 built in the first physical communication protocol 830 and at a position equivalent to the seventh layer of the OSI model, and the first physical communication protocol 830 of the first target IoT device 822 includes a source packet 854 and a target address 855 in compliance with its specification, so that the fifth information packet can be transmitted to the first target IoT device 822 correctly, and the first virtual communication protocol 850 of the fifth information packet includes the same information of the first virtual communication protocol 850 of the third information packet such as the first console IoT source packet 851, the first console IoT target address 852 and the first console IoT command or request 853.

After any one of the second IoT devices 920 transmits the fourth information packet to the second IoT console 910, the second IoT console 910 receives the fourth information packet, and the second IoT console 910 analyzes the fourth information packet and transmits a sixth information packet to the second target IoT device 922, and the sixth information packet includes a second physical communication protocol 930 of the second target IoT device 922 and a second virtual communication protocol 950 built in the second physical communication protocol 930 and at a position equivalent to the seventh layer of the OSI model, and the second physical communication protocol 930 of the second target IoT device 922 includes a source packet 954 and a target address 955 in compliance with its specification, so that the sixth information packet can be transmitted to the second target IoT device 922 correctly, and the second virtual communication protocol 950 of the sixth information packet includes the same information of the second virtual communication protocol 950 of the fourth information packet such as the second console IoT source packet 951, the second console IoT target address 952 and the second console IoT command or request 953.

After the first IoT console 810 transmits the fifth information packet to the first target IoT device 822, the first target IoT device 822 receives the fifth information packet, and the first target IoT device 822 analyzes the fifth information packet, examines the content of the first virtual communication protocol 850, confirms the first console IoT source packet 851, and executes the first console IoT command or request 853.

After the second IoT console 910 transmits the sixth information packet to the second target IoT device 922, the second target IoT device 922 receives the sixth information packet, and the second target IoT device 922 analyzes the sixth information packet, examines the content of the second virtual communication protocol 950, confirms the second console IoT source packet 951, and executes the second console IoT command or request 953.

It is common for an IoT device to be operated in two internets of things simultaneously. For example, a heater using gas for heating may have a gas concentration detector installed therein, so that the heater may be used as an IoT device for the security of the internet of things, and the heater may be used as an IoT device of an internet of things of electric appliances, and the internet of things of electric appliances may use another IoT device to turn on or off the heater or set the temperature of hot water.

Figure 5:
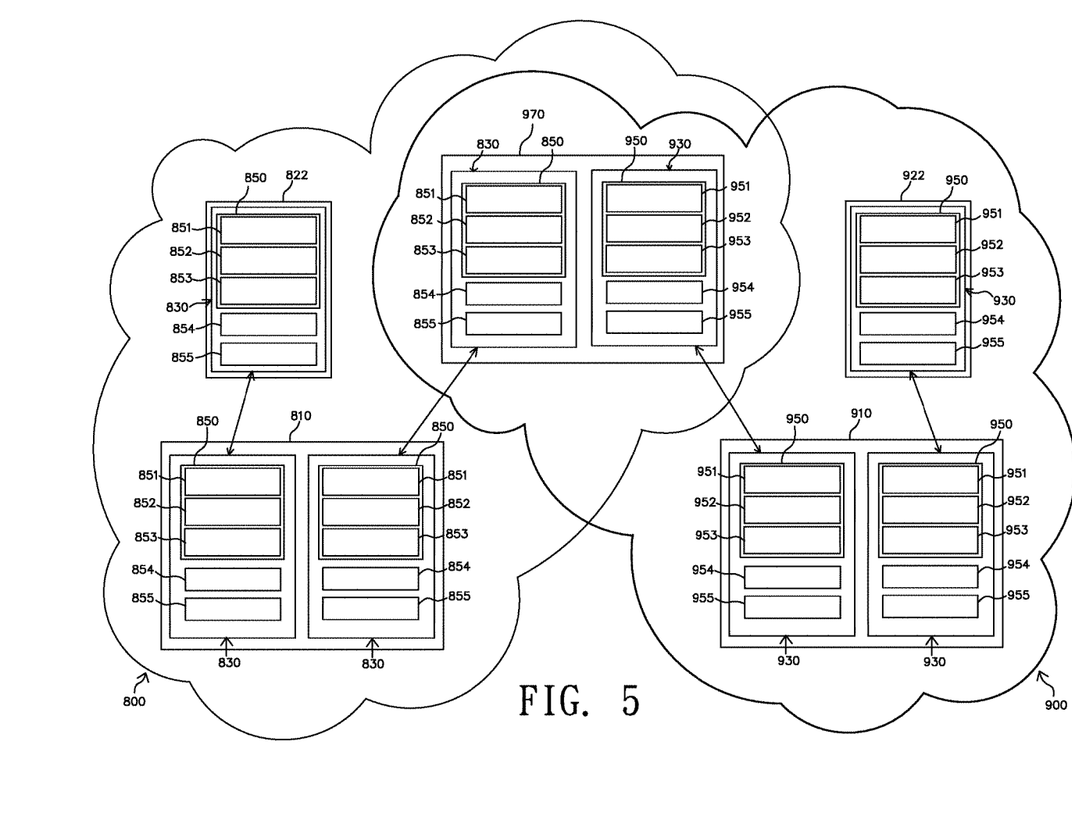
FIG. 5 is a schematic view of the structure of a fifth preferred embodiment of this disclosure.

As described in the aforementioned example, this disclosure may be applied to a plurality of internets of things. In other words, an IoT device may be connected to a plurality of internets of things simultaneously and operated successfully. With reference to FIG. 5 for a virtual communication protocol built in a physical communication protocol in accordance with the fifth preferred embodiment of this disclosure, this embodiment further describes the method for an IoT device existed and operated in two internets of things namely a first internet of things 800 and a second internet of things 900.

In the fifth preferred embodiment of this disclosure, the plurality of internets of things includes a first internet of things 800, a second internet of things 900 and at least one multi-net IoT device 970 capable of communicating with the first internet of things and the second internet of things, and the multi-net IoT device 970 also has the first physical communication protocol 830 of the first IoT device 820 of the fourth preferred embodiment, and the second physical communication protocol 930 of the second IoT device 920 of the fourth preferred embodiment, so that the multi-net IoT device 970 is connectable to the first IoT console 810 and the second IoT console 910. The multi-net IoT device 970 communicates and transmits commands to other first IoT devices 820 of the first internet of things 800 by the first IoT console 810 through the first virtual communication protocol 850 built in the first physical communication protocol 830, and the multi-net IoT device 970 communicates and transmits commands to other second IoT devices 920 of the second internet of things 900 by the second IoT console 910 through the second virtual communication protocol 950 built in the second physical communication protocol 930, so that the multi-net IoT device 970 can be operated in the first internet of things 800 and the second internet of things 900 simultaneously.

The virtual communication protocol built in a physical communication protocol 10 in accordance with this disclosure can solve the problem of the conventional IoT devices of different physical communication protocol failing to communicate with one another by building a virtual communication protocol 10 in the present existing physical communication protocol and at a position 16 equivalent to the seventh layer (or application layer) of the OSI model. By the virtual communication protocol 10, any one of the IoT devices 32 may transmit an IoT command to the IoT console 60, and then the IoT console 60 transfers the IoT command to the target IoT device 72, so that two IoT devices 32 of different physical communication protocols can communicate with each other, and transmit control commands to each other. This disclosure achieves the mutual communication effect between IoT devices 32 quickly with a low cost and without the need of re-designing the communication interface of the IoT devices. In addition, this disclosure may be applied to a plurality of internets of things. In other words, an IoT device may be connected to a plurality of internets of things and operated successfully.

While the disclosure is described in some detail hereinbelow with reference to certain illustrated embodiments, it is to be understood that there is no intent to limit it to those embodiments. On the contrary, the aim is to cover all modifications, alternatives and equivalents falling within the spirit and scope of this disclosure as defined by the appended claims.

What is claimed is:

1. A virtual communication protocol built in a physical communication protocol and executed in an Internet of Things (IoT) system, and the virtual communication protocol comprising:

a structure equivalent to a 7-layer structure of an Open Systems Interconnection (OSI) model, and the IoT system comprising at least one IoT console and a plurality of IoT devices connectable to the IoT console, each having a respective physical communication protocol, and the virtual communication protocol of each IoT device being built in each respective physical communication protocol and at a position equivalent to the seventh layer (or application layer) of the OSI model; wherein the IoT console supporting the plurality of physical communication protocols and comprising the respective physical communication protocols of the IoT devices, and the virtual communication protocol being built in a plurality of physical communication protocols of the IoT console and at a respective position equivalent to the seventh layer (or the application layer);

the virtual communication protocol of each IoT device including a unique dynamic IoT address of the IoT device allocated by the IoT console, so that each IoT device has a dynamic IoT address different from other IoT devices; and each of the IoT devices is connected to the IoT console through the physical communication protocol thereof and send a piece of data to the IoT console to request an IoT address, and then the console allocates a unique dynamic IoT address to each of the IoT devices; and the IoT console is a gateway, a router, a switch or a sharer.

2. The virtual communication protocol built in a physical communication protocol as claimed in claim 1, wherein after the IoT console allocates a unique dynamic IoT address to each of the IoT devices, the data transmitted from any one of the IoT devices connected to the IoT console are first information packets, and the first information packet includes a physical communication protocol of the respective IoT device and a virtual communication protocol built at a position equivalent to the seventh layer (or the application layer) of the OSI model, and the virtual communication protocol includes an IoT source address, an IoT target address and at least one IoT command or request; and the IoT source address is the dynamic IoT address of the IoT device, and the IoT device has a communication destination; a target IoT device is another IoT device of the internet of things, and the IoT target address is a dynamic IoT address of the target IoT device, and the IoT command or request is a command or request requested by the IoT device and executed by target IoT device.

3. The virtual communication protocol built in a physical communication protocol as claimed in claim 2, wherein after any one of the Tot devices transmits the first information packet to the IoT console, the IoT console receives the first information packet and analyzes the first information packet to issue a second information packet to be transmitted to the target IoT device and the second information packet includes a physical communication protocol of the target IoT device and a virtual communication protocol built in the physical communication protocol and at a position equivalent to the seventh layer (or the application layer of the OSI model, and the physical communication protocol of the target IoT device includes a source address and a target address in compliance with the respective protocol, so that the second information packet can be transmitted to the target IoT device correctly, and the virtual communication protocol of the second information packet includes the same information of the virtual communication protocol in the first information packet, the IoT source address, the IoT target bit address and the IoT command or request.

4. The virtual communication protocol built in a physical communication protocol as claimed in claim 3, wherein after the IoT console transmits the second information packet to the target IoT device, the target IoT device receives the second information packet, analyzes the second information packet, examines the content of the virtual communication protocol, confirms the IoT source address, and executes the IoT command or request.

5. The virtual communication protocol built in a physical communication protocol as claimed in claim 1, wherein the physical communication protocol includes a TCP/IP communication protocol, a Bluetooth communication protocol, a Zigbee communication protocol, a RS-232 communication protocol, a Wi-Fi communication protocol, a Long Term Evolution (LTE) communication protocol, a Radio Frequency Identification (RFID) communication protocol, or a Near Field Communication (NFC) communication protocol.

6. The virtual communication protocol built in a physical communication protocol as claimed in claim 1, wherein the IoT console is a mobile device.

7. The virtual communication protocol built in a physical communication protocol as claimed in claim 6, wherein the mobile device is a mobile phone, a notebook, a tablet PC or a personal digital assistant (PDA).

8. The virtual communication protocol built in a physical communication protocol as claimed in claim 1, wherein the physical communication protocols included in the IoT console are stored in a memory of the IoT console.

9. A virtual communication protocol, wherein:
the virtual communication protocol is built in a physical communication protocol and executed in a plurality of internets of things, and the plurality of internets of things including at least one first internet of things and a second internet of things, and the first internet of things including a first IoT console and a plurality of first IoT devices connectable to the first IoT console, and the second internet of things including a second IoT console and a plurality of second IoT devices connectable to the second IoT console;
each of the plurality of first IoT devices having a first physical communication protocol thereof, and any one of the first IoT devices having a first virtual communication protocol built in the first physical communication protocol and at a position equivalent to the seventh layer of the OSI model, and the first virtual communication protocol having an equivalent seven-layer structure of the OSI model;
each of the plurality of second IoT devices having a second physical communication protocol, and any one of the second IoT devices having a second virtual communication protocol built in the second physical communication protocol and at a position equivalent to the seventh layer of the OSI model, and the second virtual communication protocol having an equivalent seven-layer structure of the OSI model;
the first IoT console supporting a plurality of physical communication protocols, and comprising a first physical communication protocol of each of the respective first IoT devices, and the plurality of first physical communication protocols of the first IoT console having the first virtual communication protocol built in the first physical communication protocol and at a position equivalent to the seventh layer of the OSI model;
the second IoT console supporting a plurality of physical communication protocols, and comprising a second physical communication protocol of each of the respective second IoT devices, and the plurality of second physical communication protocols of the second IoT console having the second virtual communication protocol built in the second physical communication protocol and at a position equivalent to the seventh layer of the OSI model;
any one of the first IoT devices being connected to the first IoT console by the respective first physical communication protocol thereof, and transmitting a piece of data to the first IoT console to request an IoT address, and then the first IoT console allocating a unique first console dynamic IoT address to the first IoT device, so that the first IoT device having a first console dynamic IoT address different from those of other first IoT devices;
any one of the second IoT devices being connected to the second IoT console by the respective second physical communication protocol thereof, and transmitting a piece of data to the second IoT console to request an IoT address, and then the second IoT console allocating a unique second console dynamic IoT address to the second IoT device, so that the second IoT device having a second console dynamic IoT address different from those of other second IoT devices; and
the first IoT console or the second IoT console is a gateway, a router, a switch or a sharer.

10. The virtual communication protocol built in a physical communication protocol according to claim 9, wherein after the first IoT console allocates a unique first console dynamic IoT address to the first IoT device, the data transmitted from the first IoT device to the first IoT console are a third information packet, and the third information packet includes a first physical communication protocol of the respective first IoT device and a first virtual communication protocol built in the first physical communication protocol and at a position equivalent to the seventh layer of the OSI model, and the first virtual communication protocol includes a first console IoT source packet, a first console IoT target address and a first console IoT command or request, wherein the first console IoT source packet is the first console dynamic IoT address of the first IoT device, and the first IoT device has a communication destination, and a first target IoT device is another first IoT device of the first internet of things, and the first console IoT target address is a first console dynamic IoT address of the first target IoT device, and the first console IoT command or request is a command or request requested by the first IoT device and executed by the first target IoT device, and after the second IoT console allocates a unique second console dynamic IoT address to the second IoT device, the data transmitted from the second IoT device to the second IoT console are a fourth information packet, and the fourth information packet includes a second physical communication protocol of the second IoT device and a second virtual communication protocol built in the second physical communication protocol and at a position equivalent to the seventh layer of the OSI model, and the second virtual communication protocol includes a second console IoT source packet, a second console IoT target address and a second console IoT command or request, wherein the second console IoT source packet is a second console dynamic IoT address of the second IoT device, and the second IoT device has a communication destination, and a second target IoT device which is another IoT device of the second internet of things, and the second console IoT target address is a second console dynamic IoT address of the second target IoT device, and the second console IoT command or request is a command or request requested by the second IoT device and executed by the second target IoT device.

11. The virtual communication protocol built in a physical communication protocol according to claim 10, wherein after any one of the first IoT devices transmits the third information packet to the first IoT console, the first IoT console receives the third information packet, and the first IoT console analyzes the third information packet and transmits a fifth information packet to the first target IoT device, and the fifth information packet includes a first physical communication protocol of the first target IoT device and a first virtual communication protocol built in the first physical communication protocol and at a position equivalent to the seventh layer of the OSI model, and the first physical communication protocol of the first target IoT device includes a source packet and a target address in compliance with its specification, so that the fifth information packet can be transmitted to the first target IoT device correctly, and the first virtual communication protocol of the fifth information packet includes the same information of the first virtual communication protocol of the third information packet, such as the first console IoT source packet, the first console IoT target address and the first console IoT command or request; and after any one of the second IoT devices transmits the fourth information packet to the second IoT console, the second IoT console receives the fourth information packet, and the second IoT console analyzes the fourth information packet and transmits a sixth information packet to the second target IoT device, and the sixth information packet includes a second physical communication protocol of the second target IoT device and a second virtual communication protocol built in the second physical communication protocol and at a position equivalent to the seventh layer of the OSI model, and the second physical communication protocol of the second target IoT device includes a source packet and a target address in compliance with its specification, so that the sixth information packet can be transmitted to the second target IoT device correctly, and the second virtual communication protocol of the sixth information packet includes the same information of the second virtual communication protocol of the fourth information packet, such as the second console IoT source packet, the second console IoT target address and the second console IoT command or request.

12. The virtual communication protocol built in a physical communication protocol according to claim 11, wherein after the first IoT console transmits the fifth information packet to the first target IoT device, the first target IoT device receives the fifth information packet, and the first target IoT device analyzes the fifth information packet, examines the content of the first virtual communication protocol, confirms the first console IoT source packet, and executes the first console IoT command or request; and after the second IoT console transmits the sixth information packet to the second target IoT device, the second target IoT device receives the sixth information packet, and the second target IoT device analyzes the sixth information packet, examines the content of the second virtual communication protocol, confirms the second console IoT source packet, and executes the second console IoT command or request.

13. The virtual communication protocol built in a physical communication protocol according to claim 12, wherein the plurality of internets of things includes at least one multi-net IoT device, and the multi-net IoT device has the first physical communication protocol of the first IoT device and the second physical communication protocol of the second IoT device simultaneously, so that the multi-net IoT device is connectable to the first IoT console and the second IoT console, and the multi-net IoT device communicates with and transmits a command to other first IoT devices of the first internet of things by the first IoT console through the first virtual communication protocol built in the first physical communication protocol; and the multi-net IoT device communicates with and transmits a command to other second IoT devices of the second internet of things by the second IoT console through the second virtual communication protocol built in the second physical communication protocol.

14. The virtual communication protocol built in a physical communication protocol according to claim 11, wherein the first physical communication protocol or the second physical communication protocol is a TCP/IP communication protocol, Bluetooth communication protocol, a Zigbee communication protocol, a RS-232 communication protocol, a Wi-Fi communication protocol, a Long Term Evolution (LTE) communication protocol, a radio frequency identification (RFID) communication protocol, or a Near Field Communication (NFC) communication protocol.

15. The virtual communication protocol built in a physical communication protocol according to claim 9, wherein the first IoT console or the second IoT console is a mobile device.

16. The virtual communication protocol built in a physical communication protocol according to claim 15, wherein the mobile device is a mobile phone, a notebook, a tablet PC or a personal digital assistant (PDA).

17. The virtual communication protocol built in a physical communication protocol according to claim 9, wherein the plurality of first physical communication protocols included in the first IoT console is stored in a memory of the first IoT console, and the plurality of second physical communication protocols included in the second IoT console is stored in a memory of the second IoT console.

* * * * *